Patented Dec. 22, 1936

2,064,817

UNITED STATES PATENT OFFICE 2,064,817

MANUFACTURE OF SALTS OF DIAZOTIZED TETRAZOLE DERIVATIVES

Willi Brün, Bridgeport, Conn., assignor to Remington Arms Company, Inc., a corporation of Delaware No Drawing. Application December 10, 1932, Serial No. 646,711

1 Claim. (Cl. 260—44)

This invention relates to the production of the salts of certain derivatives of tetrazole. The compound tetrazole ($CN_4H_2$) and certain of its derivatives have hitherto been known chiefly as chemical curiosities. Recent developments have indicated the desirability of certain of them, particularly the copper ammonium salt of diazo amino tetrazole, as ingredients of priming and detonating compositions.

Diazo amino terazole has the composition $C_2N_{11}H_3$, and the structure

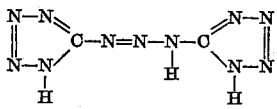

The primary sodium salt of diazo amino tetrazole, having the composition

$C_2N_{11}H_2Na + 2H_2O$, is utilized in the production of the copper ammonium salt, and the present invention relates particularly to the production of such sodium salt, although the novel methods of the invention are equally applicable to the production of other insoluble salts of diazo amino tetrazole and other diazotized tetrazole derivatives.

Stated generally, the invention comprises the discovery of suitable reacting materials and their correct proportioning; and particularly the discovery of the effect of reaction temperatures on the character and quality of the product. The raw materials which may be used include amino guanidine and its salts, and amino tetrazole and its derivatives.

As illustrative of the invention, the production of the sodium salt of diazo amino tetrazole from a salt of amino guanidine will be described.

To a solution in the proportion of 10 grams of a salt (e. g. the sulphate or the nitrate) of amino guanidine, 5 grams of sodium acetate and 7 c. c. of a non-mineral acid (e. g. glacial acetic acid) in 50 c. c. of water, there is added drop by drop a solution of 8 grams of sodium nitrate in 30 c. c. of water. It is important that the sodium nitrite be added slowly, and that the temperature be maintained well above 0° C. and below about 25° C. The best results have been secured at a temperature of approximately 15° C. (60° F.). If the temperature is higher than about 25° C. or lower than about 5° C. the precipitated salt, particularly that which comes out first, is very impure. However, when the sodium nitrite is added slowly and the proper temperature maintained, a good yield of the practically pure sodium salt is secured without either fractional crystallization or re-crystallization. Said pure sodium salt is precipitated in fine needle crystals of a very light yellow color, and the entire yield is recovered in a single filtration.

It will be noted that the acetic acid and sodium acetate do not enter into the reaction. The formation of a salt of a diazotized tetrazole requires an acidic condition, and the acid should be a non-mineral acid. Further, a constant acidity is believed to be desirable, and acetic acid with sodium acetate are known to act as a "buffer" which maintains a constant acidity. The use of other non-mineral acids is within the purview of this invention.

As heretofore stated, the method is applicable to the production of other relatively insoluble salts of diazo amino tetrazole, and other diazotized tetrazoles. It is necessary only, in order to secure a precipitate of the salt rather than of the acid itself, that the salt be less soluble than its acid. In the appended claim an "A" salt is to be understood as any salt of a diazotized tetrazole which is less soluble than its parent acid, or the same salt of nitrous acid, as the context requires.

Moreover, the method, with suitable changes in the proportions of the reacting substances, is applicable to the production of relatively insoluble salts of diazotized tetrazoles from amino tetrazole and its derivatives, as well as from amino guanidine and its salts. Accordingly, the appended claim are to be broadly construed.

What is claimed is:

In the manufacture of a sodium salt of diazo amino tetrazole, the method which comprises the addition to a solution containing sodium acetate, glacial acetic acid, and a salt of amino guanidine consisting of the nitrate and sulphate of amino guanidine, in the proportions of 5 grams of sodium acetate, 7 c. c. of glacial acetic acid, and 10 grams of the amino guanidine salt, in 50 c. c. of water; of a solution containing sodium nitrite in the proportions of 8 grams of sodium nitrite in 30 c. c. of water; the temperature of the reacting solution being maintained between 5° and 25° C., and the subsequent recovery of the entire precipitate as the substantially pure sodium salt of diazo amino tetrazole.

WILLI BRÜN.

CERTIFICATE OF CORRECTION.

Patent No. 2,064,817.  December 22, 1936.

WILLI BRÜN.

It is hereby certified that error appears in the printed specification of the above numbered patent requiring correction as follows: Page 1, first column, line 44, for "nitrate" read nitrite; and that the said Letters Patent should be read with this correction therein that the same may conform to the record of the case in the Patent Office.

Signed and sealed this 17th day of October, A. D. 1939.

(Seal)

Henry Van Arsdale,
Acting Commissioner of Patents.